United States Patent
Kalb

(10) Patent No.: US 8,663,503 B2
(45) Date of Patent: Mar. 4, 2014

(54) METHOD OF DEHYDRATING AN IONIC LIQUID

(75) Inventor: Roland Kalb, Leoben (AT)

(73) Assignee: VTU Holding GmbH, Grambach (AT)

( * ) Notice: Subject to any disclaimer, the term of this patent is extended or adjusted under 35 U.S.C. 154(b) by 52 days.

(21) Appl. No.: 13/265,835

(22) PCT Filed: Apr. 23, 2010

(86) PCT No.: PCT/EP2010/055448
§ 371 (c)(1),
(2), (4) Date: Dec. 29, 2011

(87) PCT Pub. No.: WO2010/122150
PCT Pub. Date: Oct. 28, 2010

(65) Prior Publication Data
US 2012/0116096 A1    May 10, 2012

(30) Foreign Application Priority Data
Apr. 23, 2009 (EP) ..................................... 09158667

(51) Int. Cl.
*B01D 12/00* (2006.01)
*C09K 3/00* (2006.01)

(52) U.S. Cl.
CPC ........................ *C09K 3/00* (2013.01)
USPC ........................ 252/364; 548/335.1

(58) Field of Classification Search
None
See application file for complete search history.

(56) References Cited

U.S. PATENT DOCUMENTS

| 4,261,702 A | | 4/1981 | Sweeney et al. |
| 4,830,939 A | * | 5/1989 | Lee et al. ...................... 429/312 |
| 5,419,985 A | * | 5/1995 | Koksbang ...................... 429/212 |
| 2004/0199015 A1 | | 10/2004 | Yuyama et al. |
| 2008/0194807 A1 | | 8/2008 | Buchanan et al. |
| 2008/0221353 A1 | | 9/2008 | Tsunashima |

FOREIGN PATENT DOCUMENTS

| EP | 2 163 545 A1 | 3/2010 | |
| WO | WO 2005019137 A1 | 3/2005 | |
| WO | WO2008153045 A1 * | 12/2008 | ........... C07D 233/58 |
| WO | WO2010028493 A1 * | 3/2010 | ............. F25B 43/00 |

OTHER PUBLICATIONS

Katase, Takuma et al., Water Content and Related Physical Properties of Aliphatic Quaternary Ammonium Imide-Type Liquid Containing Metal Ions, Department of Materials Science and Engineering, Kyoto University, Yoshida-hommachi, Sakyo-ku, Kyoto 606-8501, Japan, available online Oct. 4, 2006.

English Language Translation of Office Action issued Aug. 9, 2013 by the State Intellectual Property Office of China, pp. 1-8.

* cited by examiner

*Primary Examiner* — Samantha Shterengarts
*Assistant Examiner* — Amanda L Aguirre
(74) *Attorney, Agent, or Firm* — Robert A. Blaha; Smith Risley Tempel Santos LLC

(57) ABSTRACT

A method of impeding water input in an ionic liquid is provided, wherein the method comprises adding an additive to the ionic liquid wherein the additive comprises an orthoester. In particular, at least some residues of the additive may remain or may be present in the ionic liquid during the usage of the ionic liquid. For example, the additive may be formed by the orthoester or by a mixture of orthoesters.

11 Claims, No Drawings

METHOD OF DEHYDRATING AN IONIC LIQUID

FIELD OF THE INVENTION

The invention relates to a method of dehydrating an ionic liquid.

BACKGROUND OF THE INVENTION

Ionic liquids are liquid organic salts or mixtures of salt consisting of organic cations and organic or inorganic anions and having a melting point of less than 100° C. Additionally inorganic salts and/or additives may be solved in these ionic liquids. These ionic liquids exhibit some very interesting characteristics, e.g. having a very low, virtually non measurable, vapor pressure, a high liquidus range, good electrical conductivity, and interesting solvation characteristics. These characteristics may predestine ionic liquids for several applications, e.g. as solvents (for example, in organic or inorganic synthesis, transition metal catalysis, biocatalysis, multiphase reactions, photochemistry, polymer synthesis, and nanotechnology), extracting agent (for example, liquid-liquid or liquid gaseous extraction, sulphur removal during crude oil processing, removal of heavy metals during water processing and liquid membrane extraction), electrolytes (for example, in batteries, fuel cells, capacitors, solar cells, sensors, in electrochemistry, electroplating, electrochemical metal processing, electrochemical synthesis, electroorganic synthesis, and nanotechnology), lubricants, thermofluids, gels, reagents for organic synthesis, in the so-called "green chemistry" (e.g. as replacement for volatile organic compounds), static inhibitors, specific applications in chemical analysis (e.g. gas chromatography, mass spectroscopy, capillary zone electrophoresis), and liquid crystals, etc. More details may be found in "Rogers, Robin D.; Seddon, Kenneth R. (Eds.); Ionic Liquids—Industrial Applications to Green Chemistry, ACS Symposium Series 818, 2002; ISBN 0841237891" and in "Wasserscheid, Peter; Welton, Tom (Eds.); Ionic Liquids in Synthesis, Verlag Wiley-VCH 2003; ISBN 3527305157". The characteristics of ionic liquids may be adapted to any desired application by varying the respective anions and cations. Due to this wide variety of possible characteristics ionic liquids are often called "designer solvents".

However, in many applications possible impurities, pollutions or contaminations of the ionic liquid may cause disadvantageous effects.

OBJECT AND SUMMARY OF THE INVENTION

It may be an objective of the invention to provide a method of impeding contamination of an ionic liquid.

This object may be solved by a method impeding contaminations, in particular water contaminations, of an ionic liquid. Further exemplary embodiments are described in the dependent claims.

According to an exemplary aspect of the invention a method of impeding water input in an ionic liquid is provided, wherein the method comprises adding an additive to the ionic liquid wherein the additive comprises an orthoester.

In particular, at least some residues of the additive may remain or may be present in the ionic liquid during the usage of the ionic liquid. For example, the additive may be formed by the orthoester or by a mixture of orthoesters. Thus, the additive comprising the orthoester may form a buffer for buffering future water intake into the ionic liquid during the usage of the ionic liquid. The usage of the orthoester as an additive may have to be distinguished from the usage of a drying agent used by the production of the ionic liquid which is after the production process removed from the ionic liquid. That is, the term "additive" may particularly denote a substance which is added during or after a manufacturing process and which remains at least in sufficient amount, i.e. not only in traces, in the manufactured product during the normal or intended use of the product, e.g. as solvents, extracting agents, electrolytes, lubricants, thermofluids, gels, reagents for organic synthesis, in the so-called "green chemistry", static inhibitors, specific applications in chemical analysis, and liquid crystals. An example for such an additive may be a buffering substance or buffer which is present in a manufactured product or substance. That is, an exemplary aspect may be the usage of an additive comprising an orthoester as a buffering substance for an ionic liquid.

It should be noted that according to this application the term "ionic liquid" may also include liquid organic salts or mixtures of salts comprising organic cations and organic or inorganic anions and having a melting point of less than 200° C. That is, the term "ionic liquid" may also include molten salts having a melting point of more than 100° C. but less than 200° C., since these ionic liquids do not differ in their other characteristics from ionic liquids having a melting point of less than 100° C. which is typically the melting point threshold according to the prior art.

The term "water input" may particularly denote an absorption or incorporation of water into the ionic liquid, e.g. due to hygroscopic effects of the ionic liquid during use of the same.

In particular, the amount of additive comprising the orthoester remaining in the ionic liquid during the usage may form or may act as a buffer for water input during the usage since any water input into the ionic liquid may steadily or immediately react with the orthoester of the additive. Thus, it may be possible to ensure that no water is present in the ionic liquid during the usage of the ionic liquid. In case water would be present in the ionic liquid this water may cause some disadvantageous effects on chemical and/or physical characteristics of the ionic liquid which can be omitted or at least reduced when using the method of impeding of water contamination according to an exemplary aspect. Some of these disadvantageous effects may be the hydrolytic decomposition of the ionic liquid, e.g. of the anion, which may lead to corrosion of devices using the ionic liquid, e.g. due to acidity of the decomposition products. These corrosion effects may particularly relevant in case of high operation temperatures and/or in case long lifetime. Furthermore, some ionic liquids are hygroscopic, similar to solid salts, so that it may be difficult to dehydrate the ionic liquid in the beginning therefore the use of a buffering additive may possibly lead to a reduced water amount during lifetime of the ionic liquid. Thus, the additive may act as an anti corrosion additive steadily removing water input into the ionic liquid so that hydrolysis and decomposition of the ionic liquid may be inhibited or at least reduced. Furthermore, the generation of corrosive reaction products may be inhibited or at least reduced, which are typically acidic and which may harm or damage a device using the ionic liquid.

Next, further aspects of exemplary embodiments of the method of impeding water contamination are described.

According to an exemplary embodiment the method further comprises dehydrating a water containing ionic liquid to produce the ionic liquid. In particular, the dehydrating may be performed by the adding of the additive into the water containing ionic liquid in a hyperstoichiometric amount. That is, the dehydrating and the adding of the additive, i.e. the impeding of possible future water contamination, may be performed in a single step or simultaneous steps.

In other words, the orthoester may be added in an amount which is higher than the amount which is needed that all water in the ionic liquid can react. Before adding the additive or orthoester into the ionic liquid the content of water may be determined or estimated in order to determine the necessary stoichiometric amount. Then the additive may be added in a hyperstoichiometric amount. Typically numbers may be in the range of 10 ppm to about 20 vol % percent of the amount of the ionic liquid or to an extend that after the reaction with the contained water the ionic liquid contains between 10 ppm and 20 vol % of the additive in particular between 100 ppm and 5 vol % and preferably between 1000 ppm and 1 vol %. Thus, an ionic liquid which is already contaminated with traces of water may be dehydrated by using an orthoester and some residues of the orthoester may remain in the dehydrated ionic liquid may build a reservoir and may impede future contamination of the ionic liquid. These residues may act as a kind of buffer for future contaminations.

In this application the term "dehydration" or "dehydrating" may particularly denote a procedure reducing the amount of water present in a liquid phase, e.g. the ionic liquid. In particular, the term may also include the process where water is removed out of the ionic liquid which is already present in the ionic liquid in traces. Thus, the term "ionic liquid" may particularly denote a pure ionic liquid as well as a liquid mixture having an ionic liquid or a mixture of different ionic liquids as main component which may however include water in small traces, e.g. below 5% or below 1% in volume. That is, the term "ionic liquid" may particularly denote any liquid substance in which an ionic liquid or a mixture of different ionic liquids forms the main component, e.g. may correspond to a fraction of more than 80% or 90% in volume. The orthoester may form a liquid dehydration or drying agent buffering water input during the use of the ionic liquid. That is, in a first step the water containing ionic liquid may be processed to form a dehydrated ionic liquid by adding the orthoester, since the orthoester may react with the water contained in the ionic liquid to alcohol and ester. Thus, the adding of the orthoester may dehydrate the ionic liquid even in case the products (e.g. esters and alcohols) are not removed. In a second step the orthoester may form an additive remaining in the ionic liquid to possibly prevent future water contaminations. It should be stated that of course the first additive used for the dehydration may comprise a first orthoester while the second additive used as an impeding additive may comprise a second orthoester. According to specific embodiments the first orthoester and the second orthoester may either be the same or may be different.

According to an exemplary embodiment of the method the orthoester has a boiling temperature which is below a predetermined threshold.

In particular, the threshold may be determined under consideration of the melting temperature of the ionic liquid. For example, the melting temperature of the ionic liquid and the boiling temperature of the orthoester may be in the same range. However, the boiling temperature of the orthoester may be higher than the melting temperature of the ionic liquid. Since the melting temperature of the ionic liquid may be below 200° C., in particular below 150° C. and more particularly below 100° C., the predetermined threshold may also be in the range of 200° C., 150° C. and 100° C., respectively. According to some embodiments the orthoester may be liquid, e.g. liquid at room temperature or at least at the temperatures the ionic liquid is in the liquid phase. That is, the orthoester and the ionic liquid may be chosen in such a way that a temperature and/or pressure range exists in which both are in the liquid phase. In particular, the predetermined threshold may characterize a low boiling temperature. Orthoester having a low boiling temperature may not react with the ionic liquid and may be solvable in the ionic liquid, i.e. the orthoester and the ionic liquid may form a homogeneous solution. However, at the same time such orthoester may readily react with the water present in small amount or traces in the ionic liquid while the resulting products may be liquid and may have a low boiling temperature or point as well. In case an orthoester is used having a low boiling point and/or the respective resulting products having a low boiling temperature it may be possible to easily remove the orthoester and/or the resulting products out of the ionic liquid, e.g. as a continuous gas stream. In particular, the threshold may ensure a low boiling temperature, wherein low may be defined compared to the operating temperature of the ionic liquid, i.e. the temperature the ionic liquid is used. In this context a low boiling temperature is a temperature close to the operating temperature, e.g. a value which is about 10° C. higher or 30° C. higher than the operating temperature so that the orthoester may be easily removable out of the ionic liquid by heating the ionic liquid to a small extend. The same of course may be valid for the resulting products, e.g. ester and/or alcohols. Thus, a low boiling temperature may ensure an easy removable of the orthoester and/or of the resulting products out of the ionic liquid.

According to another exemplary embodiment of the method the orthoester has a boiling temperature which is above a predetermined threshold.

The threshold may be determined under consideration of the melting temperature of the ionic liquid and/or of the operating temperature. In particular, the threshold may be chosen in such a way that the orthoester boils at a temperature well above the operating temperature, e.g. 30° C. to up to 100° C. above the operating temperature. For example, the operating temperature may be room temperature while the boiling temperature of the orthoester may be in the range of 125° C. Such a threshold may ensure a high boiling temperature, i.e. may ensure that the orthoester stays liquid in the ionic liquid and does not fumigate out of the ionic liquid at the operating temperature. Thus, a high threshold or high boiling temperature may be defined in such a way that the orthoester stays liquid at the operating temperature and does not fumigate. The same of course may be valid for the resulting products, e.g. ester and/or alcohols. That is, the orthoester and/or the products resulting from a reaction of the orthoester and the water contained in the ionic liquid may have a boiling temperature which is higher than the operating temperature and may remain in the ionic liquid during the intended usage of the ionic liquid.

However, it may be possible to select an orthoester having a high boiling temperature, i.e. which is well above the operating temperature, while the resulting products, i.e. the reaction products of the orthoester and water, may have a low boiling temperature, which may be only a little higher or even below the operating temperature. Such an orthoester may particularly useful for an additive staying in the ionic liquid in order to prevent contamination of the ionic liquid, since the high boiling temperature of the orthoester may ensure that it does not outgas while the low boiling temperature of the resulting products may ensure that they can be easily removed out of the ionic liquid.

It should be noted that in case a dehydrating step is performed before an impeding additive is added, the dehydrating agent may comprise an orthoester having a low boiling temperature and/or ensures that the resulting products have a low boiling temperature, so that they may be easily removed, while the impeding additive, which stays in the ionic liquid during the use of the same, may comprise an orthoester having a high boiling temperature so that the orthoester remains in the ionic liquid during the use of the same. However, the resulting products of the orthoester of the impeding additive may have a low boiling temperature so that they may be easily removed out of the ionic liquid.

According to an exemplary embodiment the method further comprises removing alcohols and/or ester which are formed when dehydrating the water containing ionic liquid.

In particular, the alcohols and/or esters are products of a reaction of the orthoester with water contained or present in the ionic liquid. For example, the alcohols and/or esters may be removed out of the ionic liquid by warming or heating and/or exposing the dehydrated ionic liquid to a vacuum or decreased pressure, e.g. a pressure which is below atmospheric pressure. The term "vacuum" may particularly denote any pressure which is achieved by decreasing the pressure originally present in the vicinity the ionic liquid is present and does not necessarily denote a pressure close to 0 hPa. In this sense a pressure of about 100 hPa or 10 hPa may also represent a vacuum. The removing step may be performed once during a dehydration step or may be performed several times during the use of the ionic liquid, e.g. each time water inputs or penetrates into the ionic liquid. However, some residues of the orthoester may remain in the ionic liquid.

According to an exemplary embodiment the method further comprises adding a catalyst. In particular, the catalyst may be an acid.

For example, the acid may be a volatile acid and/or an acid having a boiling temperature which is below a predetermined threshold. The threshold may be determined based on the decomposition temperature or the typical application temperature of the ionic liquid, e.g. may be in the same order as the decomposition temperature or the typical application temperature of the ionic liquid, similar as described in the context of the boiling temperature of the orthoester. For another example, the acid may be a nonvolatile acid and/or an acid having a boiling temperature which is above a predetermined threshold and will stay in the ionic liquid without evaporating, similar as described in the context of the boiling temperature of the orthoester. Furthermore, it may be possible that the ionic liquid itself be acidic, e.g. may form a weak acid or may have a low acidity.

According to an exemplary embodiment of the method the ionic liquid comprises an anion and the anion corresponds to the deprotonated acid. That is, the anion, or in case of different types of anions being present in the ionic liquid at least one of the different types of anions, of the ionic liquid may be the same as the anion which is generated when the acid is deprotonated. Thus, it may be possible to say that the acid is the conjugate acid of the anion of the ionic liquid.

In case the respective acid is not volatile it may be possible that traces of the acid may remain in the ionic liquid.

According to an exemplary embodiment the method further comprises adding a further acid which has an acidity constant value which is higher than the acidity constant value of the acid.

In particular, the acidity constant value of the further acid may be increased by at least 1 compared to the acidity constant value of the acid, more particularly it may be increased by at least 2. The further acid may be a volatile acid and/or may be an acid having a low boiling point, e.g. a boiling point which is lower than the melting point of the ionic liquid. Additionally or alternatively, the acid or a fraction of the acid may be extracted by using a dry drying agent.

By adding a further acid to the dehydrated ionic liquid it may be possible that traces of the catalyst acid is replaced by the further acid which may be more easily removed due to its volatile behavior and/or a low boiling point. However, as described above also the further acid may be non-volatile and/or may remain in the ionic liquid and/or may not evaporate. Moreover, the further acid may be an ionic liquid itself or a part of the ionic liquid. Furthermore, the further acid may be a reaction product of the ionic liquid. For example, alkyl sulphate anions, e.g. methyl sulphate $CH_3SO_4$, reacts with water or traces of water by producing methanol and hydrogen sulphate which itself is acidic. In this example, the first acidic reaction products may act as acidic catalyst and may afterwards suppress a further hydrolysis by the reaction of water with orthoester.

According to an exemplary embodiment of the method the orthoester is one out of the group consisting of orthoformates, orthocarbonates, cyclic orthoesters, lactone acetals, orthoformic acid trimethyl ester, orthoformic acid triethyl ester, orthoacetic acid trimethyl ester, orthoacetic acid triethyl ester, orthocarbonic acid tetra methyl ester, and orthocarbonic acid tetraethyl ester.

Summarizing, according to an exemplary aspect of the invention, a method of impeding water contamination of an ionic liquid may be provided. The method may comprise the adding of an impeding additive into the ionic liquid. The impeding additive may remain in the ionic liquid during the use of the ionic liquid and may absorb or react with water input into the ionic liquid. In particular, the orthoester may form a part of the additive and may as well be used in the beginning to dehydrate the ionic liquid. Orthoesters may be suitable additives and/or dehydrating agents for ionic liquids since it may be possible to reduce and/or keep the water contamination to a fraction of about a few volume percent or even to about 100 ppm which may not be possible by using common dehydrating agents like metallic sodium, calcium oxide or phosphorus pentoxide, which may react with the ionic liquid itself while the reaction product may not be easily removed by distillation since ionic liquid exhibits virtually no vapor pressure. For the same reasons sodium sulphate, magnesium perchlorate, calcium sulphate may not be suitable. Orthoesters may also be more suitable than molecular sieves, zeolite, or aluminum oxide which are typically not effective for removing small traces of water. In particular, molecular sieves may release some water instead of removing it or may release other pollutions like iron or chloride. Besides that, these conventional drying agents described above are solids, while orthoesters are liquids and are in most of the cases miscible with the ionic liquids to form a homogeneous phase.

The use of orthoesters as an impeding agent or dehydrating agent may as well be less destructive for the ionic liquid than heating and/or exposing the ionic liquid to a vacuum or low pressure which may lead to color changing or decomposing of the ionic liquid even when using an inert gas and may not suitable to remove small traces of water, e.g. to an amount of about 100 ppm.

The aspects defined above and further aspects of the invention are apparent from the examples of embodiment to be described hereinafter and are explained with reference to these examples of embodiment. It should be noted that features described in connection with one exemplary embodiment or exemplary aspect may be combined with other exemplary embodiments and other exemplary aspects.

DESCRIPTION OF EMBODIMENTS

In the following exemplary embodiments of the invention will be described in more detail.

For dehydrating an ionic liquid an additive and/or dehydrating agent may be added to a water-contaminated ionic liquid. Preferably the additive may comprise a liquid orthoester having a low boiling temperature, e.g. below 200° C., in particular below 150° C. and more particularly below 100° C. Typically such orthoester do not react with the ionic liquid itself and may be solvable in the ionic liquid. However, they may react easily and fast with the water contained in the ionic liquid to reaction products which are liquid as well and may exhibit low boiling points. Furthermore, the liquid orthoester as well as the reaction products, e.g. esters and alcohols, may form weak solvates, so that they may be removed easily by slightly heating and/or reducing pressure.

To improve the dehydrating capability of the additive a catalyst may be added like an volatile acid having a low boiling temperature, e.g. below 150° C. Possible acids may be formic acid, acetic acid, propionic acid, hydrochloric acid, bromhydric acid, or the like. In particular, an acid may be used which is associated to the anion of the ionic liquid, i.e. the anion corresponds to the deprotonated acid, in case this acid is volatile and has a low boiling temperature. However, in case the respective acid is not volatile a small amount of the acid may remain in the ionic liquid without decreasing the performance of the ionic liquid to a great extend. Alternatively, the acid may be removed in an extractive way, e.g. using dry organic drying agents. Another possibility may be to replace or substitute the residues of the acid in the ionic liquid by another acid which is volatile and has a low boiling point, and which has an acidity constant value which is higher than the acidity constant value of the acid. In particular, the acidity constant value of the further acid may be increased by at least 1 compared to the acidity constant value of the acid, more particularly it may be increased by at least 2.

A suitable orthoester for dehydrating 1-ethyl-3-methylimidazoliumthiocyanate (EMIM-SCN) may be orthoformic acid triethyl ester. For example, 1.8 g of orthoformic acid triethyl ester (1.1 equivalent) may be added to 50 g of EMIM-SCN together with a few drops of formic acid used as a catalyst acid. Then the mixture may be stirred for one hour at 50° C. Afterwards the remaining orthoester and the resulting products (methanol and methylformate) may be removed using a rotary evaporator at 70° C. while lowering the pressure to about 10 hPa. This may reduce an initial amount of water of about 5540 ppm to about 35 ppm while no pollutions may be seen in an infrared spectra or a $^1$H-NMR.

For impeding future water contamination of the dehydrated ionic liquid the additive for dehydrating or another suitable additive comprising an orthoester may be added in a hyperstoichiometric amount. That is, the dehydrating and an adding of an impeding agent or additive may be performed in a single step or simultaneous steps. However, the impeding additive may be added in another step after the dehydrating and a potential removing of the products of the dehydrating process is completed. In particular, the impeding additive may comprise another orthoester as the one used in the dehydrating.

The orthoester of the dehydrating additive and/or the impeding additive may react with the water in the ionic liquid according to the generic formula:

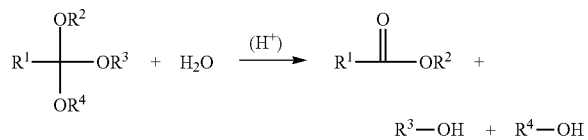

wherein at least one of $R^1$, $R^2$, $R^3$ and/or $R^4$ is a moiety out of the group consisting of C1-C10-alkyl, alkenyl, alkenyl, cycloalkyl, cycloalkenyl, C6-C10 aryl or heteroaryl, and a halogen. In particular, $R^1$ may be hydrogen leading to orthoformates, or $R^1$ may be a C1-C10 alkoxy- or aryloxy leading to orthocarbonates. Alternatively, $R^1$, $R^2$, $R^3$ and $R^4$ may be connected to each other, e.g. by C1-C6-alkyl-, alkenyl-, alkenyl-chains, leading to cyclic orthoesters or lactone acetals. In some embodiments $R^1$ may be one of hydrogen, methyl-, ethyl-, methoxy- and ethoxy while $R^2$, $R^3$ and $R^4$ may be methyl- or ethyl. According to some specific examples, $R^1$ may be hydrogen while $R^2$, $R^3$ and $R^4$ may be methyl leading to orthoformic acid trimethyl ester, $R^1$ may be hydrogen while $R^2$, $R^3$ and $R^4$ may be ethyl leading to orthoformic acid triethyl ester, $R'$, $R^2$, $R^3$ and $R^4$ may be methyl leading to orthoacetic acid trimethyl ester, $R^1$ may be methyl while $R^2$, $R^3$ and $R^4$ may be ethyl leading to orthoacetic acid triethyl ester, $R^1$ may be methoxy—while $R^2$, $R^3$ and $R^4$ may be methyl leading to orthocarbonic acid tetramethyl ester, or $R^1$ may be ethoxy—while $R^2$, $R^3$ and $R^4$ may be ethyl leading to orthocarbonic acid tetraethyl ester. Alternatively, the moieties may be dioxolane C1-C10 2-alkoxy-1,3-dioxolane or 2-alkoxy-1,3-dioxane leading to cyclic orthoester.

The described method may be suitable to dehydrate ionic liquids and to impede future water contamination of the ionic liquid in an efficient and low aggressive manner. Furthermore, very low water contaminations, e.g. below 100 ppm or even below 10 ppm may be achievable without causing complex removal of solid or liquid reaction products and without causing a great amount of decomposition due to thermal effects. The reaction of the orthoester and the contained water is typically carried out at temperatures below 100° C., in particular below 70° C. and more particularly below 50° C. or below 30° C. for durations of a couple of hours, in particular less than 1 hour, more particularly less than 15 minutes. In case the orthoester or at least traces of it remains in the ionic liquid during the use or operation of the ionic liquid, i.e. forms a kind of additive, the typical reaction temperature may be in the range of the working temperature of the ionic liquid. In case this working temperature is low, e.g. room temperature (25° C.) or below, the reaction rate may be reduced. However, since the orthoester remains in the ionic liquid, e.g. a quasi infinite reaction period), a low reaction rate may be sufficient. The removing of excess orthoester and/or reaction products may be performed by heating the ionic liquid to temperatures below 70° C., in particular less than 50° C. and if applicable using a vacuum of less than 1 mbar or hPa, in particular less than 20 mbar or 20 hPa during a time period of less than 1 hour, in particular less than 15 minutes, more particularly less than 1 minute. For example, rotary evaporator, falling film evaporator, thin-film evaporator or short way evaporator may be used.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of impeding water input in an ionic liquid comprising at least one organic cation and at least one organic or inorganic anion, the method comprising:
    adding an additive to the ionic liquid wherein the additive comprises an orthoester and the additive remains in the ionic liquid during the use of the ionic liquid.

2. The method according to claim 1, further comprising:
    dehydrating a water-containing ionic liquid to produce the ionic liquid.

3. The method according to claim 2, further comprising:
    removing alcohols and/or esters which are formed when dehydrating the water-containing ionic liquid.

4. The method according to claim 2, wherein the dehydrating is performed by the adding of the additive into the water-containing ionic liquid in a hyperstoichiometric amount.

5. The method according to claim 1, wherein the orthoester has a boiling temperature below 200° C.

6. The method according to claim 1, wherein the orthoester has a boiling temperature above 100° C.

7. The method according claim 1, further comprising:
    adding a catalyst.

8. The method according to claim 7, wherein the catalyst is an acid.

9. The method according to claim 8, wherein the ionic liquid comprises an anion and wherein the anion corresponds to the acid in its deprotonated form.

10. The method according to claim 9, further comprising:
    adding a further acid which has an acidity constant value which is higher than the acidity constant value of the acid.

11. The method according to claim 1, wherein the orthoester is one out of the group consisting of:
    orthoformates,
    orthocarbonates,
    cyclic orthoesters,
    lactone acetals,
    orthoformic acid trimethyl ester,
    orthoformic acid triethyl ester,
    orthoacetic acid trimethyl ester,
    orthoacetic acid triethyl ester,
    orthocarbonic acid tetramethyl ester, and
    orthocarbonic acid tetraethyl ester.

* * * * *